US007216432B2

(12) United States Patent
Poteet

(10) Patent No.: US 7,216,432 B2
(45) Date of Patent: May 15, 2007

(54) CULINARY IMPLEMENT WITH INTERCHANGEABLE ELEMENTS

(75) Inventor: Michael A. Poteet, 13424 SE. Parkside Dr., Happy Valley, OR (US) 97236

(73) Assignee: Michael A. Poteet, Happy Valley, OR (US)

( * ) Notice: Subject to any disclaimer, the term of this patent is extended or adjusted under 35 U.S.C. 154(b) by 16 days.

(21) Appl. No.: 10/788,877

(22) Filed: Feb. 27, 2004

(65) Prior Publication Data

US 2005/0188545 A1 Sep. 1, 2005

(51) Int. Cl.
*B25G 3/00* (2006.01)
*A47J 45/00* (2006.01)

(52) U.S. Cl. ............................ 30/340; 30/319; 30/142; 30/365; 16/422

(58) Field of Classification Search .................. 30/340, 30/162, 151, 319, 142, 365, 306, 307; 16/422, 16/110.1
See application file for complete search history.

(56) References Cited

U.S. PATENT DOCUMENTS 699,584 A * 5/1902 Smith .......................... 30/319
2,506,862 A * 5/1950 Faehnel ....................... 452/145
2,915,823 A * 12/1959 Wohlfeil ....................... 30/306
3,798,702 A * 3/1974 Plauda ..................... 15/236.06
3,924,328 A * 12/1975 Mould .......................... 30/307
4,974,286 A 12/1990 Stowell et al.
5,479,708 A 1/1996 Thomas
5,480,031 A * 1/1996 Maultasch et al. .......... 206/525
5,555,625 A * 9/1996 Scheminger ................. 30/319
5,933,918 A * 8/1999 Wallays ..................... 16/114.1

* cited by examiner

*Primary Examiner*—Charles Goodman
(74) *Attorney, Agent, or Firm*—Banner & Witcoff, Ltd.

(57) ABSTRACT

A culinary implement is disclosed that includes a handle, an attachment arm, and a rotatable head portion. The handle has an elongate configuration, and the attachment arm extends beyond an end of the handle. The attachment arm incorporates a first part of an attachment mechanism that is located proximal an end of the attachment arm. The head portion incorporates a second part of the attachment mechanism. The second part is joinable with the first part to secure the head portion to the attachment arm, and the second part is separable from the first part to detach the head portion from the attachment arm. When the head portion is detached, one of a plurality of alternate head portions may be secured to the attachment arm.

30 Claims, 11 Drawing Sheets

CULINARY IMPLEMENT WITH INTERCHANGEABLE ELEMENTS

BACKGROUND OF THE INVENTION

1. Field of the Invention

The present invention relates to culinary implements. The invention concerns, more particularly, a culinary implement with a handle and a rotatable head portion that is interchangeable with one of a plurality of other head portions.

2. Description of Background Art

A variety of culinary implements are utilized in the culinary arts, including knives, tenderizers, marinating tools, and mincers, for example. In general, each of these implements is a separate device and, in combination, may require a significant quantity of storage space. In order to limit the degree of storage space necessary for such culinary implements, various multi-purpose culinary implements have been proposed. For example, U.S. Pat. No. 4,974,286 to Stowell, et al. discloses a culinary implement that includes a universal handle and a plurality of interchangeable portions that include a brush, a spatula, and a spoon. U.S. Pat. No. 5,479,708 to Thomas discloses a utensil holder for infants that includes interchangeable forks and spoons of various configurations. In addition, U.S. Pat. No. 5,933,918 discloses a culinary implement with an interchangeable cutter, peeler, and brush. Although the various prior art devices may provide interchangeable elements, the devices do not provide an effective structure for interchanging a variety of rotatable elements.

SUMMARY OF THE INVENTION

The present invention is a culinary implement that includes a handle, an attachment arm, and a head portion. The handle has an elongate configuration that defines a pair of ends and a longitudinal axis extending through the ends. The attachment arm is secured to the handle and extends beyond one of the ends of the handle. The attachment arm has a non-linear configuration that defines an end area of the attachment arm, and the end area incorporates a first part of an attachment mechanism. At least one of the end area and the first part define a rotation axis that is substantially perpendicular to the longitudinal axis. The head portion is rotatable about the rotation axis, and the head portion incorporates a second part of the attachment mechanism. The second part is joinable with the first part to secure the head portion to the attachment arm, and the second part is separable from the first part to detach the head portion from the attachment arm.

The culinary implement may also include a release mechanism for separating the first part and the second part. The release mechanism may include an actuator and a connector, the actuator being incorporated into the handle and accessible from an exterior of the handle, and the connector extending through the attachment arm to join with both the actuator and the first part.

The head portion may also be interchangeable with an alternate head portion, the alternate head portion being joinable with the first part and rotatable about the rotation axis. In some embodiments, the head portion has a first width and the alternate head portion has a second width, the first width being greater than the second width. Despite the difference in widths, the longitudinal axis extends through a center of the first width when the head portion is secured to the attachment arm, and the longitudinal axis extends through a center of the second width when the alternate head portion is secured to the attachment arm. In addition, a side of the head portion may define a depression, and the end area of the attachment arm may extend into the depression when the head portion is secured to the attachment arm.

A plurality of projections may extend outward from the head portion, and the projections may have a twisted configuration. In some embodiments, the projections have a pyramidal shape that defines a point and a height axis extending inward from the point, and the projections may be deformed in a direction that extends around the height axis.

In another aspect of the invention, the head portion may be configured to perform a first function, and the handle may include a device for performing a second function that is different from the first function. The device may be positioned at the end located opposite the attachment arm, and the device may be a plurality of projections extend from the end of the handle located opposite the attachment arm.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose a culinary implement 10 in accordance with the present invention. Implement 10 is a multi-function device that is suitable for a plurality of culinary functions, such as cutting, mincing, flattening, marinating, or tenderizing, for example. The primary elements of implement 10 are a handle 20, an attachment arm 30, a variety of head portions **40*a*–40*e*, and a release mechanism 50. In general, handle 20** provides a structure for grasping implement 10. Attachment arm 30 extends beyond an end of handle 20, and one of head portions 40*a*–40*e* is rotatably-secured to attachment arm 30. Release mechanism 50 is utilized to detach one of head portions 40*a*–40*e* from attachment arm 30, thereby permitting a different one of head portions 40*a*–40*e* to be secured to attachment arm 30.

Implement 10 is a multi-function device that is suitable for a plurality of culinary operations, such as cutting, mincing, flattening, marinating, or tenderizing, for example, depending upon the specific head portion 40*a*–40*e* that is secured to attachment arm 30. A plurality of head portions with other configurations may also be secured to attachment arm 30 in order to configure culinary implement 10 for other culinary operations. Accordingly, head portions 40*a*–40*e* are disclosed to provide an example of the various head portion configurations that are intended to fall within the scope of the present invention.

Figure 1:
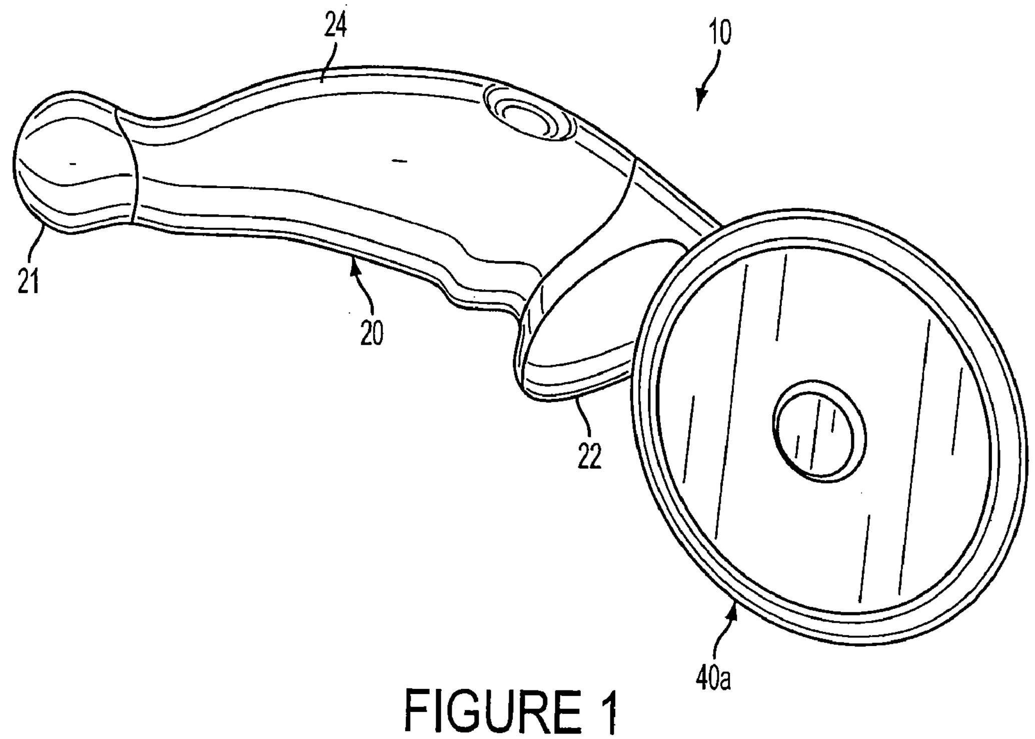
FIG. 1 is a perspective view of a culinary implement having a first head portion, in accordance with the present invention.
Figure 2:
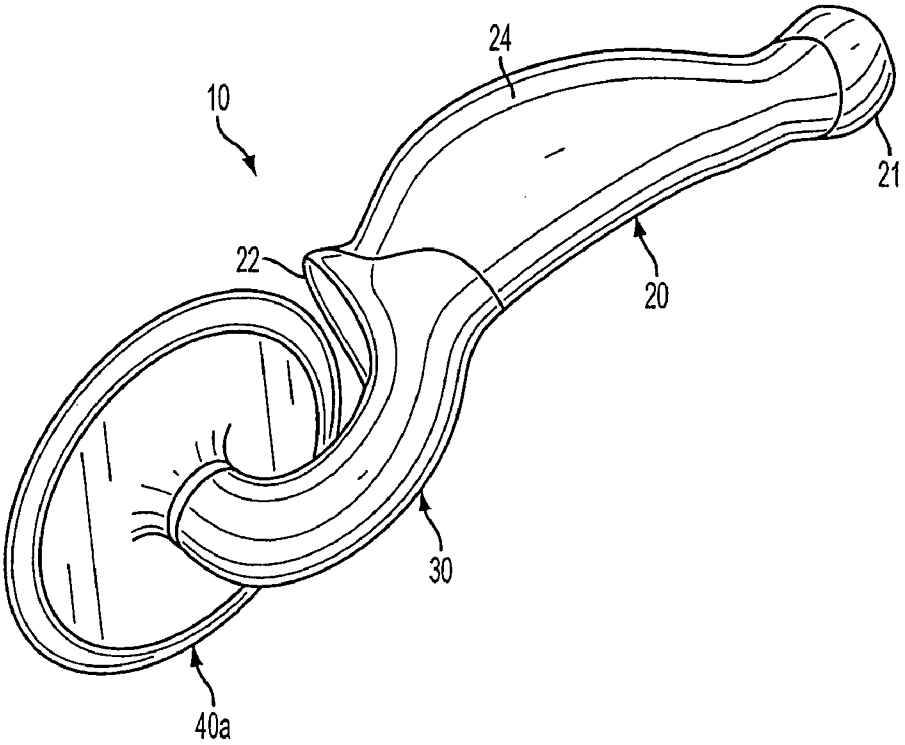
FIG. 2 is another perspective view of the culinary implement.
Figure 3:
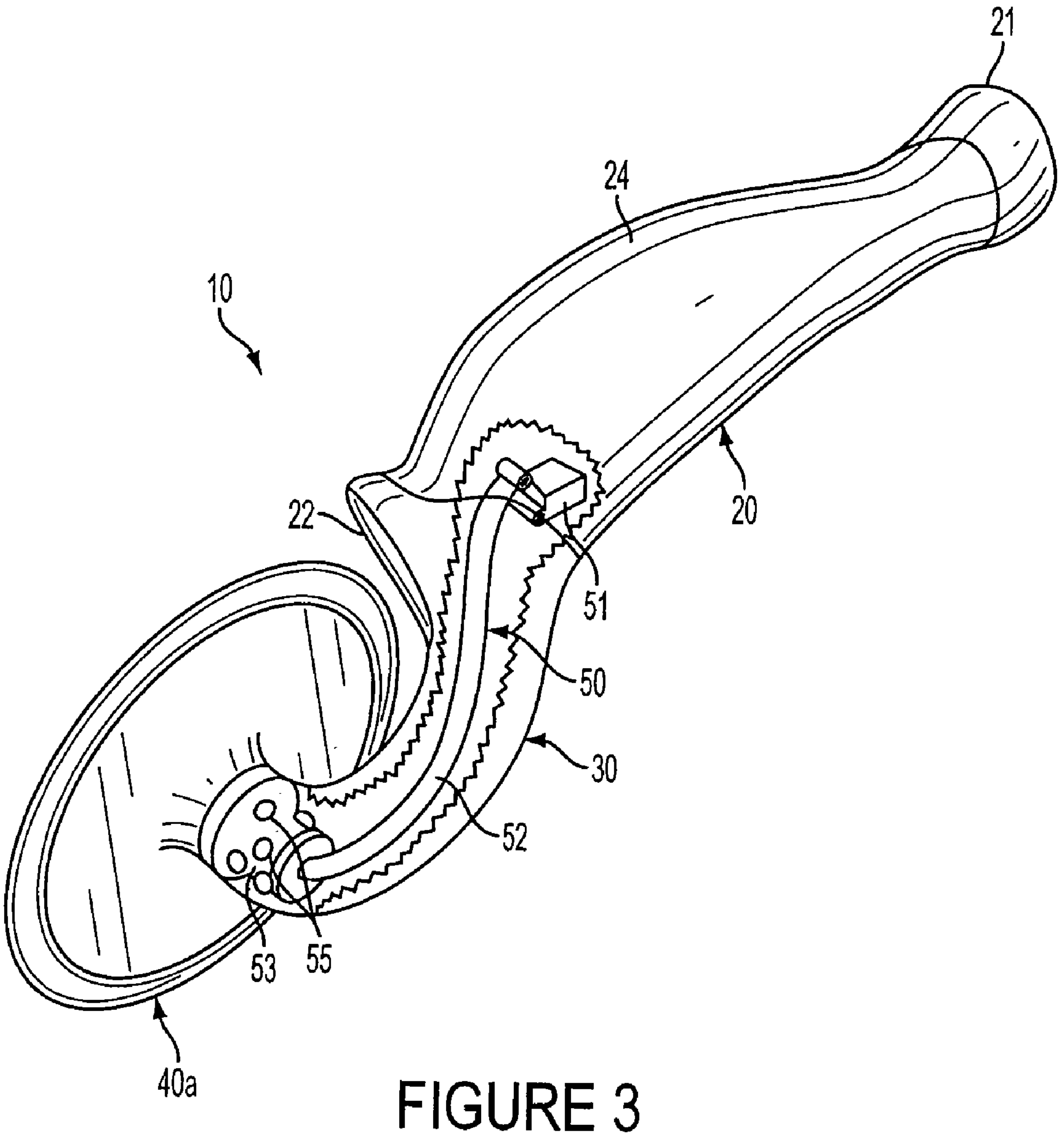
FIG. 3 is a partial cut-away perspective view of the culinary implement.
Figure 4:
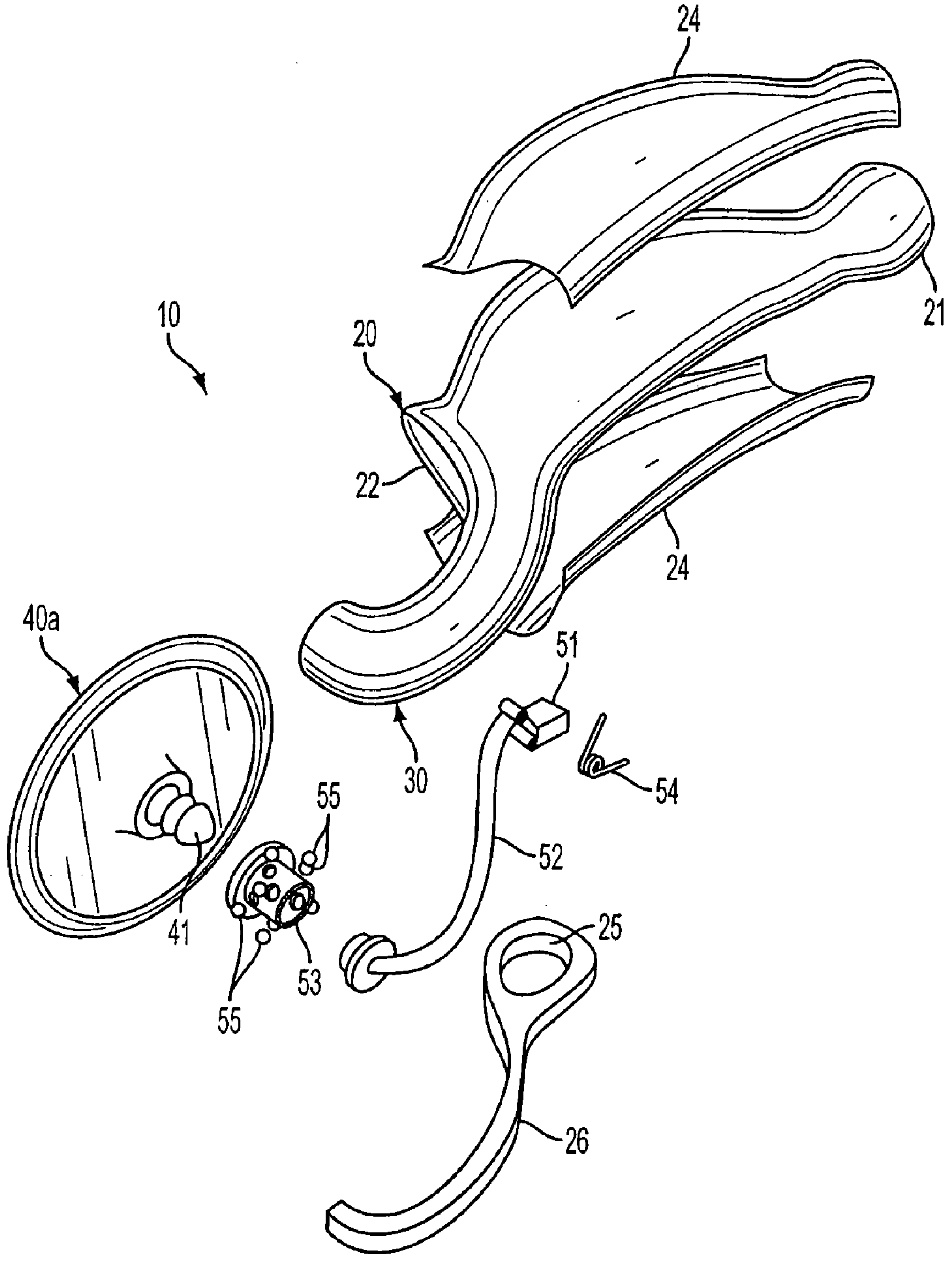
FIG. 4 is an exploded perspective view of the culinary implement.
Figure 5:
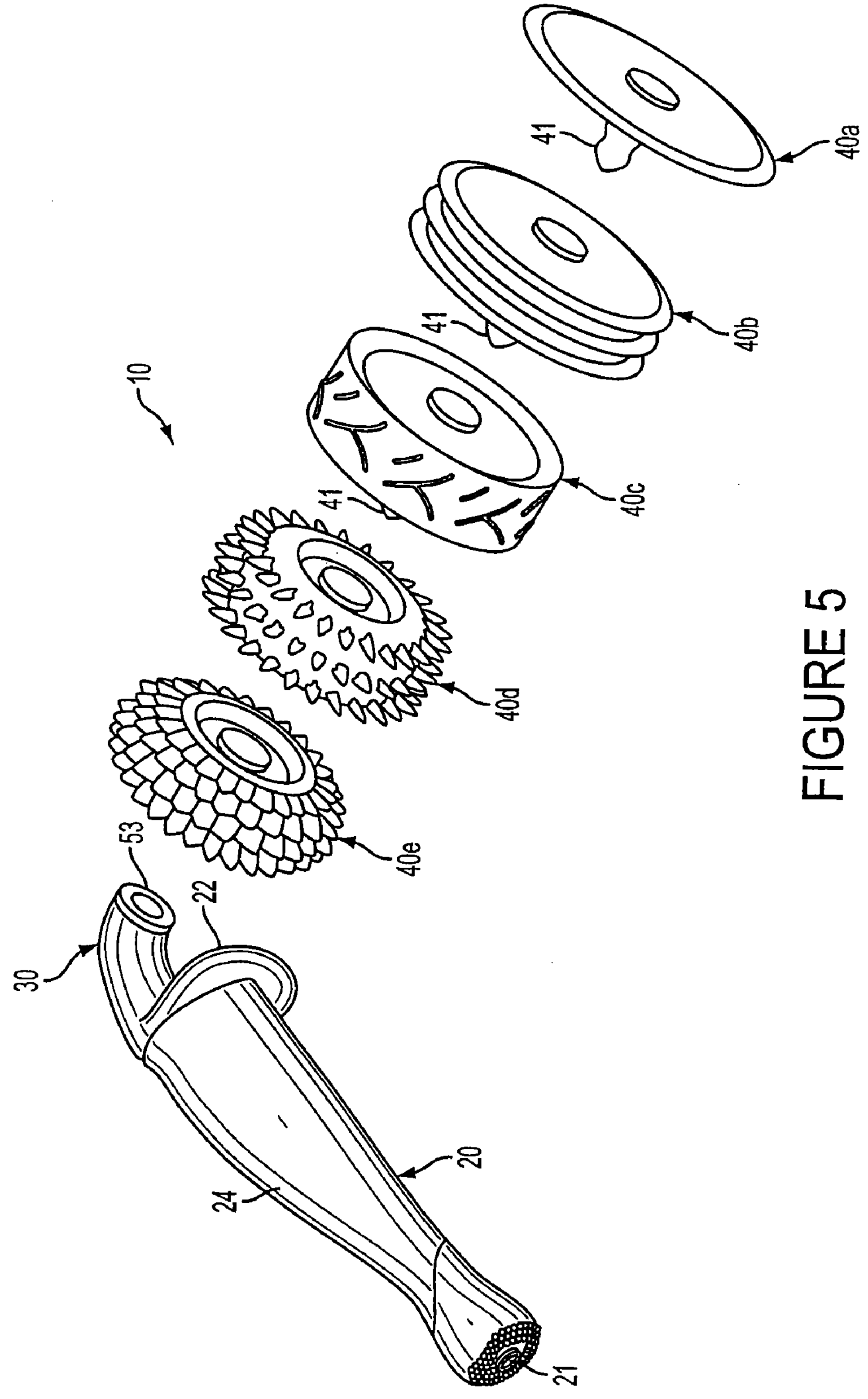
FIG. 5 is a partially exploded perspective view of the culinary implement that includes the first head portion and second through fifth head portions.
Figure 6:
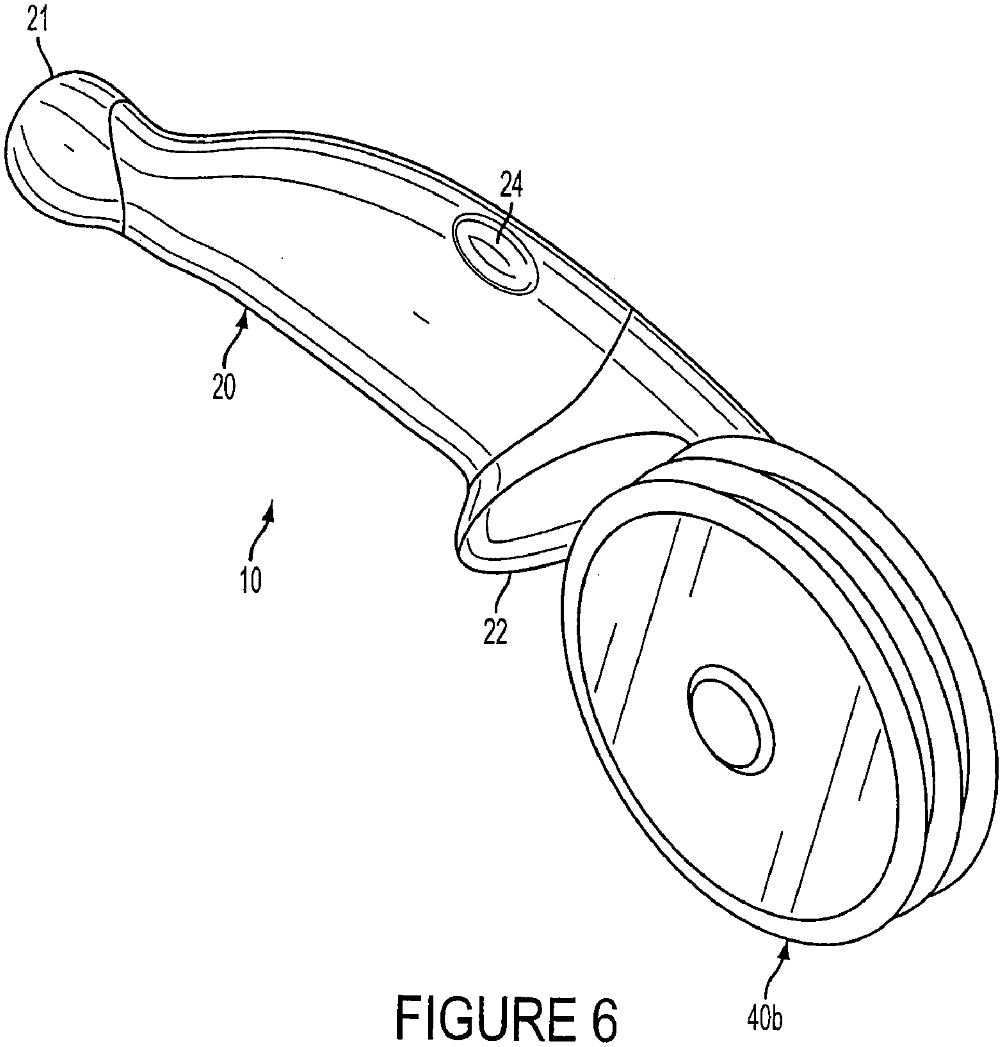
FIG. 6 is a perspective view of the culinary implement with the second head portion.
Figure 7:
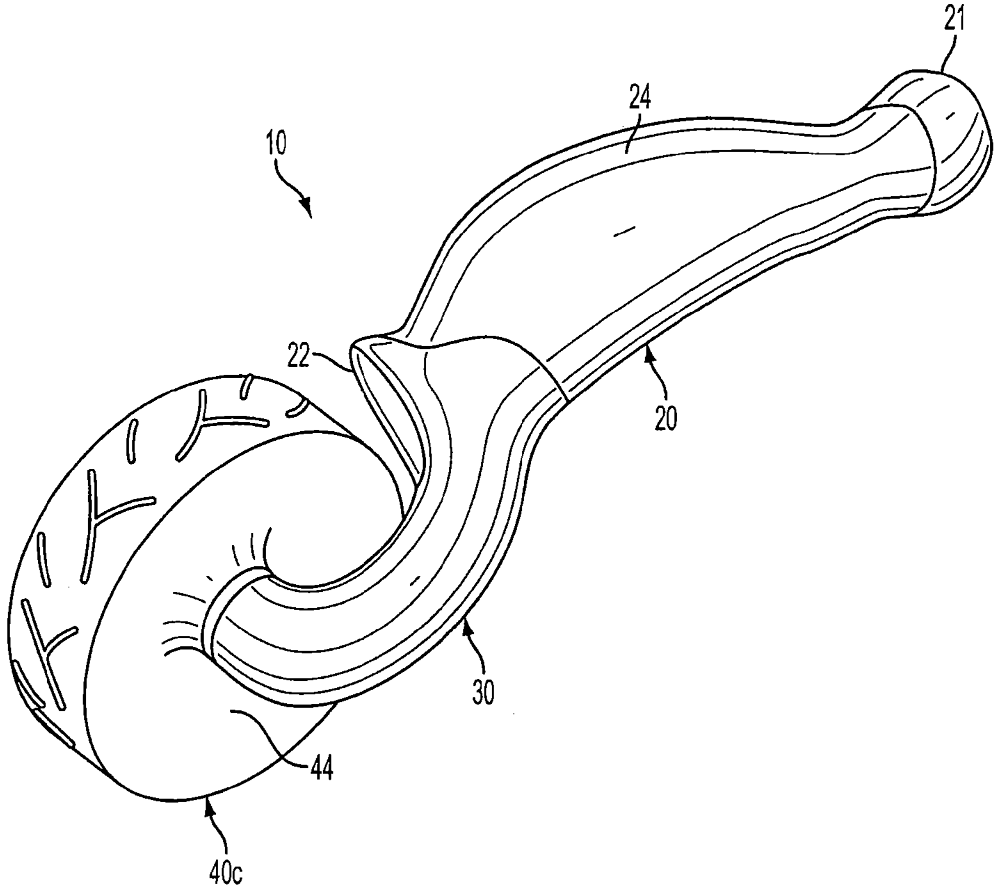
FIG. 7 is a perspective view of the culinary implement with the third head portion.
Figure 8:
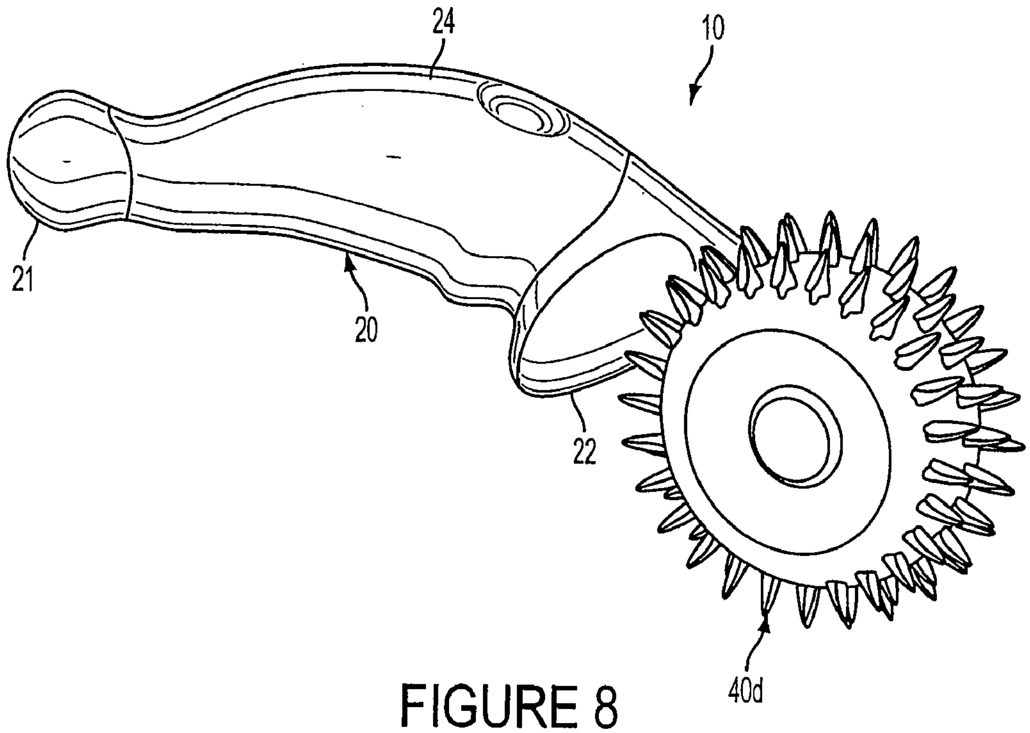
FIG. 8 is a perspective view of the culinary implement with the fourth head portion.

Referring to FIGS. 1–4, implement 10 is depicted in combination with head portion 40*a*, which is a rotating cutting device, such as a pizza cutter. Head portion 40*a* may, however, be interchanged with any of head portions 40*b*–40*e*, as depicted in FIG. 5. More particularly, head portion 40*a* may be replaced with head portion 40*b*, as depicted in FIG. 6, which is a rotating mincing device that includes three blades. Head portion 40*a* may also be replaced with head portion 40*c*, as depicted in FIG. 7, which is a rotating flattening device that includes a generally flat, textured surface. In addition, head portion 40*a* may be replaced with head portion 40*d*, as depicted in FIG. 8, which is a rotating marinating device that includes a plurality of elongate projections.

Figure 9:
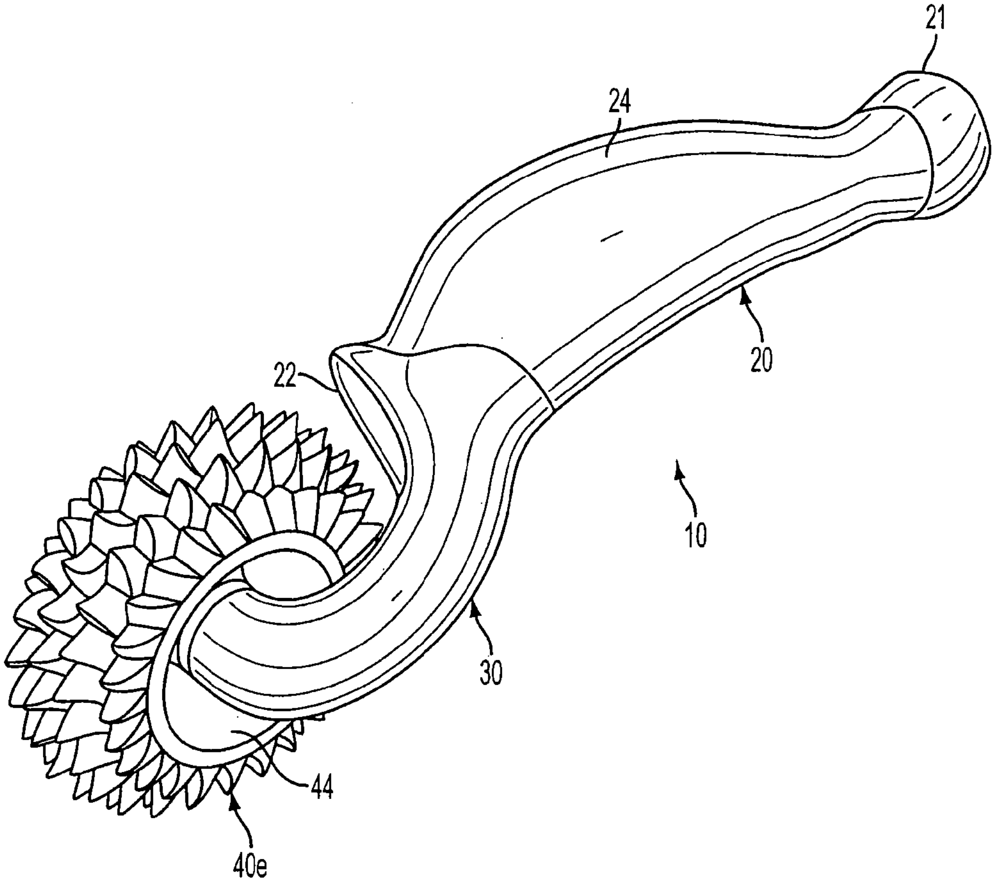
FIG. 9 is a perspective view of the culinary implement with the fifth head portion.
Figure 10:
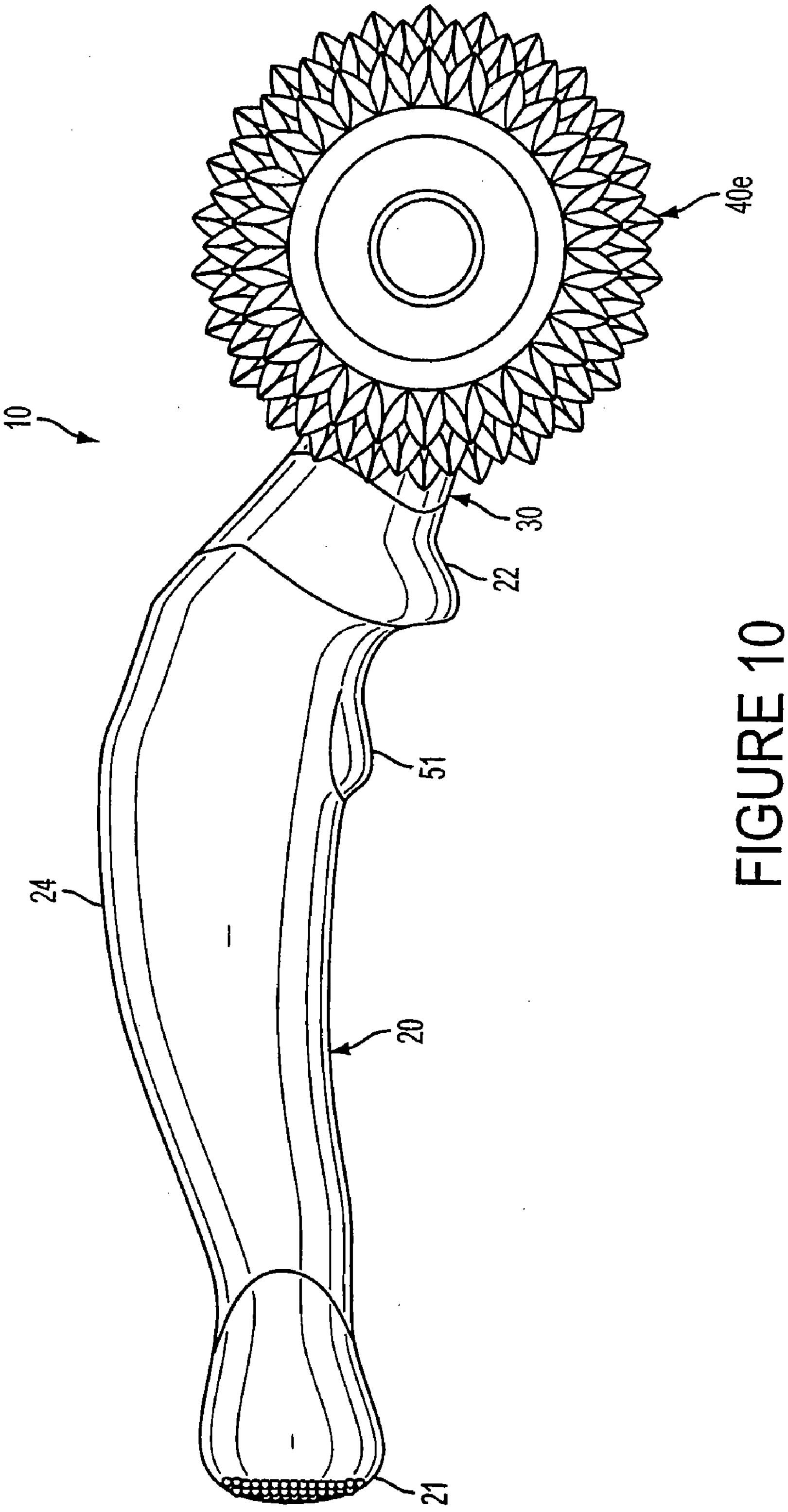
FIG. 10 is a side elevational view of the culinary implement with the fifth head portion.
Figure 11:
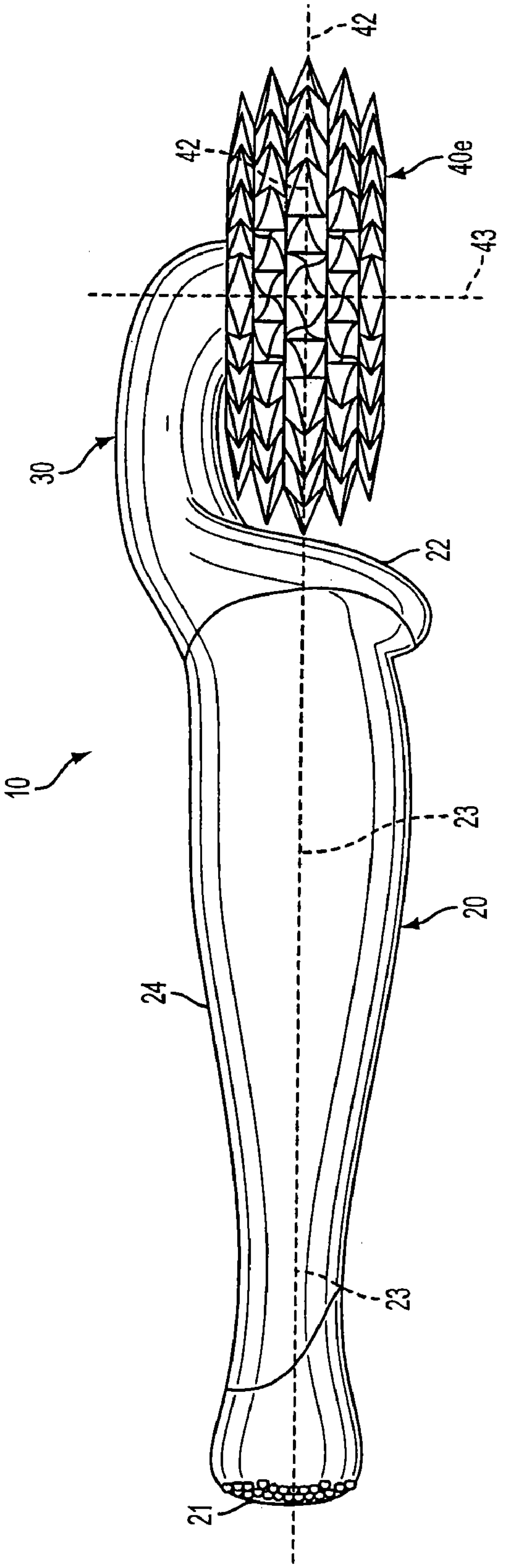
FIG. 11 is a top plan view of the culinary implement with the fifth head portion.

Furthermore, head portion 40*a* may be replaced with head portion 40*e*, as depicted in FIGS. 9–11, which is a rotating tenderizing device that also includes a plurality of projections. Accordingly, an individual may interchange or otherwise secure any of head portions 40*a*–40*e* to attachment arm 30 in order to configure implement 10 for a specific culinary function.

Handle 20 exhibits a generally elongate configuration that provides a structure for grasping or holding implement 10. Handle 20 is ergonomically-designed or otherwise contoured to conform to the shape of the hand and provide a comfortable interface between the hand and implement 10. For purposes of reference, handle 20 includes a rearward end 21, an opposite forward end 22, and a longitudinal axis 23 (depicted for reference in FIG. 11) that extends along the length of handle 20 and between ends 22 and 23. As depicted in the various figures, handle 20 has a generally cylindrical shape that changes in girth along longitudinal axis 23 to impart the contoured shape. More particularly, handle 20 exhibits a relatively narrow girth adjacent rearward end 21, and handle 20 increases in girth in areas that approach forward end 22. In other embodiments of the invention, however, handle 20 may exhibit a less-contoured shape or may be contoured in other respects. Accordingly, the overall configuration of handle 20 may vary significantly within the scope of the present invention.

Attachment arm 30 extends outward from handle 20 to secure one of head portions 40*a*–40*e* beyond forward end 22 and in alignment with longitudinal axis 23. Accordingly, attachment arm 30 extends from a side of handle 20 and beyond forward end 22, and attachment arm 30 has a curved, angular, or otherwise non-linear configuration that does not interfere with the area immediately beyond forward end 22. As will be discussed in greater detail below, head portions 40*a*–40*e* are secured to an end of attachment arm 30 and are rotatable with respect to handle 20 and attachment arm 30. Accordingly, the specific shape of attachment arm 30 is selected to properly position head portions 40*a*–40*e* relative to handle 20.

Handle 20 and attachment arm 30 are depicted in the figures as being formed of unitary (i.e., one-piece) construction. An advantage of the unitary construction is that handle 20 and attachment arm 30 may be formed in a single molding or casting operation, for example, thereby decreasing manufacturing costs. Another advantage of the unitary construction relates to overall durability. In use, significant forces may be induced in both handle 20 and attachment arm 30. For example, the forces may attempt to bend each of handle 20 and attachment arm 30, and the forces may induce a torsional load upon attachment arm 30, for example. Following significant use, such forces may degrade a mechanical connection between handle 20 and attachment arm 30, thereby limiting the utility of implement 10. Accordingly, handle 20 and attachment arm 30 are formed of unitary construction to enhance the overall durability and useful life of implement 10. In other embodiments of the invention, however, a sufficiently durable mechanical connection may be formed between handle 20 and attachment arm 30 when each are formed separately.

Suitable materials for handle 20 and attachment arm 30 include various metal and polymer materials, for example. With regard to metal materials, stainless steel, aluminum, and titanium provide suitable strength and corrosion-resistance for both handle 20 and attachment arm 30. In addition, suitable polymer materials for handle 20 and attachment arm 30 include polyester, thermoset urethane, thermoplastic urethane, various nylon formulations, or blends of these materials. More particularly, handle 20 and attachment arm 30 may be formed from a high flex modulus polyether block amide, such as PEBAX, which is manufactured by the Atofina Company. Polyether block amide provides a variety of characteristics that benefit the present invention, including high impact resistance, few property variations in the temperature range of minus 40 degrees Celsius to positive 80 degrees Celsius, and resistance to degradation by a variety of chemicals. Another suitable material for handle 20 and attachment arm 30 is a polybutylene terephthalate, such as HYTREL, which is manufactured by E.I. duPont de Nemours and Company. Composite materials may also be formed by incorporating glass fibers or carbon fibers into the polymer materials discussed above, thereby enhancing the strength of handle 20 and attachment arm 30.

Although handle 20 and attachment arm 30 may be formed from a single material, two or more materials may form handle 20 and attachment arm 30 in some embodiments of the invention. For example, a pair of elements 24 may extend over portions of handle 20 in order to provide a slip-resistant and semi-compressible covering for enhancing the comfort of implement 10. Elements 24 may be formed from a foam or rubber material, for example, that is both durable and resistant to chemical degradation. Although elements 24 may be secured to the exterior of handle 20, elements 24 may also be recessed into handle 20.

Release mechanism 50 operates to secure head portion 40*a* (or one of the other head portions 40*b*–40*e*) to attachment arm 30 and also release head portion 40*a* from attachment arm 30. Referring to FIGS. 3 and 4, the various components of release mechanism 50 include an actuator 51, a connector 52, a bushing 53, a spring 54, and a plurality of bearings 55. Actuator 51 extends through or is otherwise accessible through an aperture 25 that is formed in a removable access element 26 of handle 20 and attachment arm 30. One of elements 24 may extend over aperture 25 and actuator 51 to prevent matter from entering handle 20 through aperture 25. Accordingly, actuator 51 extends through a lower area of handle 20 and is operable by the individual. Connector 52 is joined to actuator 51 and extends through attachment arm 30 to join with bushing 53, which has a generally cylindrical configuration and is located in an end of attachment arm 30. Spring 54 is joined to actuator 51 and depressably-holds actuator 51 in position within aperture 25. In addition, bearings 55 protrude through apertures in bushing 54 and form protrusions on the inner surface of bushing 54. Although this configuration of release mechanism 50 provides a suitable manner of securing and releasing head portions 40–40*e*, a variety of other mechanisms may also be utilized within the scope of the present invention.

In order to secure head portion 40*a* to attachment arm 30, an individual aligns a ribbed or otherwise grooved protrusion 41 on head portion 40*a* (and on each of head portions 40*b*–40*e*) with an end of attachment arm 30, which corresponds with the location of bushing 53. The individual then presses upon head portion 40*a* until protrusion 41 extends into bushing 53. As protrusion 41 extends into bushing 53, bearings 55 project into the various grooves of protrusion 41 and effectively prevent removal of protrusion 41, thereby securing head portion 40*a* to attachment arm 30.

In addition to securing head portion 40*a* to attachment arm 30, release mechanism 50 also operates to release or otherwise separate head 40*a* from attachment arm 30. In order to remove protrusion 41 from bushing 53, the individual depresses actuator 51, which impels connector 52 to move forward and dislocate bushing 53. An interior surface of attachment arm 30 is textured to include a plurality of grooves that are similar in configuration to the grooves on protrusion 41. When head portion 40*a* is secured within bushing 53, bearings 55 are held in position by the ridges or protruding portions of the grooves. When bushing 53 is dislocated, however, bearings 55 may retreat from the apertures in bushing 53 and extend into the grooves. When placed within the grooves, bearings 55 do not protrude significantly through the apertures in bushing 54, and protrusion 41 may slide from bushing 53, thereby releasing head portion 40*a* from attachment arm 30. The individual may then release actuator 51, which returns to its original position due to the presence of spring 54.

Head portion 40*a* has the configuration of a rotating cutting device, such as a pizza cutter, that includes a single circular rotating blade. In operation, an individual grasps handle 20 and places head portion 40*a* in contact with a foodstuff. The individual then rolls head portions 40*a* against the foodstuff until a desired amount of cutting is achieved. Accordingly, head portion 40*a* rotates relative to handle 20 and attachment arm 30. The rotational movement of head portion 40*a* may be achieved by locating bearings at the interface of protrusion 41 and the primary, circular portion of head portion 40*a*. Alternately, the rotational movement of head portion 40*a* may be achieved by designing release mechanism 50 such that protrusion 41 rotates relative to bushing 53, or by designing release mechanism 50 such that protrusion 41 and bushing 53 rotate relative to handle 20 and attachment arm 30. An advantage of designing release mechanism 50 to impart the rotational movement is that a secure, non-rotatable connection may be formed between protrusion 41 and the remainder of head portion 40*a*. Accordingly, a variety of rotational mechanisms may be incorporated into implement 10 in order to promote the rotational movement of head portion 40*a*.

Head portion 40*b* has the configuration of a rotating mincing device that includes three circular rotating blades that are spaced from each other. Whereas head portion 40*a* forms a single cut in a foodstuff, head portion 40*b* forms three parallel cuts that may be utilized to form strips of the foodstuff or to mince the foodstuff. In general, the three blades exhibit the same diameter as the blade of head portion 40*a*, but may also have a different diameter. In addition, two or four blades, for example, may be incorporated into head portion 40*b*.

Head portion 40*c* has the configuration of a rotating flattening device that includes a generally flat, textured surface. Whereas head portions 40*a* and 40*b* cut or mince the foodstuff, head portion 40*c* is utilized to flatten or otherwise smooth the foodstuff. In some embodiments of the present invention, the surface of head portion 40*c* may be entirely smooth and untextured to prevent or otherwise limit slippage of implement 10 relative to the foodstuff. As depicted in the figures, however, the surface of head portion 40*c* has a plurality of linear and y-shaped ridges.

Head portion 40*d* is a rotating marinating device that includes a plurality of elongate projections. In operation, the projections extend into the foodstuff and form perforations in the foodstuff, thereby permitting a marinade or other liquid to enter the foodstuff. Head portion 40*e* is a rotating tenderizing device that includes a plurality of projections that are both wider and shorter than the projections of head portion 40*d*. The differing dimensions of the projections configure head portion 40*e* to be suitable for tenderizing the foodstuff. The projections of both head portions 40*d* and 40*e* exhibit a twisted configuration. More particularly, each of the projections are depicted as having a generally pyramidal shape that defines a point and a height axis extending inward from the point, and the projections are deformed in a direction that extends around the height axis. Accordingly, the projections generally have the configuration of a twisted pyramid. An advantage of the twisted configuration of the projections is that the foodstuff is not only perforated, but also stretched. Although the pyramidal shape of the projections depicted in the figures has four discrete sides, the pyramidal shape may have three discrete sides within some embodiments of the invention. In addition, other twisted shapes may be utilized for the various projections, such as the twisted configuration of a corkscrew shape, for example. In some embodiments, the projections may also exhibit a non-twisted configuration.

The relative locations of the various elements of implement 10 have an effect upon the usability and comfort of implement 10, and will now be discussed with reference to FIG. 11. In general, handle 20 and head portion 40*e* (and the other head portions 40*a*–40*d* when secured to attachment arm 30) are located such that longitudinal axis 23 of handle 20 extends through a centerline 42 of head portion 40*e* when secured to attachment arm 30. In other words, longitudinal axis 23 is aligned with a central area of head portion 40*e*. This configuration limits the degree of torsional force that is transferred to handle 20 during use of implement 10. If, for example, longitudinal axis 23 and centerline 42 of head portion 40*e* were not aligned, the torsional force would induce a twisting in handle 20 that may be perceived by the individual, and the individual would have to resist or otherwise counter the torsional force with additional effort. By aligning longitudinal axis 23 and centerline 42 of head portion 40*e*, however, the torsional force is significantly reduced or eliminated. Similar considerations apply to head portions 40*a*–40*d*.

Head portions 40*a*–40*e* each exhibit different widths, but are each configured such that the various centerlines 42 of each head portion 40*a*–40*e* align with longitudinal axis 23. For example, head portion 40*e* has a significantly greater width than head portion 40*a*. In order to ensure that the centerlines 42 of head portions 40*a* and 40*e* are aligned with longitudinal axis 23 when secured to attachment arm 30, the side of head portion 40*e* with protrusion 41 forms a depression 44 that receives attachment arm 30. In other words, the sides of each head portion 40*a*–40*e* are configured to locate protrusion 41 such that centerlines 42 align with longitudinal axis 23. A depression 44 is also formed in each of head portions 40*c* and 40*d*. In general, the depth of depression 44 increases as the width of head portions 40*c* and 40*d* increase, and the depth of depression 44 decreases as the width of head portions 40*c* and 40*d* decrease. Due to the lesser overall width of head portions 40*a* and 40*b*, neither of these include a structure that corresponds with depression 44. Accordingly, depression 44 permits centerlines 42 of the various head portions 40*c*–40*e* to align with longitudinal axis 23.

Another feature of implement 10 that enhances the usability and comfort is the relative orientations of handle 23 and head portion 40*a*. Referring to FIG. 11, a rotational axis 43 of head portion 40*e* (and the other head portions 40*b*–40*e* when secured to attachment arm 30) is perpendicular to longitudinal axis 23. In use, the individual typically attempts to move head portion 40*e* in the direction of centerline 42, which is perpendicular to rotational axis 43. By orienting rotational axis 43 perpendicular to longitudinal axis 23, the individual naturally moves head portion 40*e* in the direction of longitudinal axis 23 and centerline 42.

Head portions 40*a*–40*e* provide a first culinary function, which includes either cutting, mincing, flattening, marinating, or tenderizing, for example. Implement 10 may be configured to provide a second culinary function that is separate from the function provided by head portions 40*a*–40*e*. Referring to rearward end 21 of handle 20, a generally textured area of handle 20 is depicted. The texture includes a plurality of relatively sharp projections that may be utilized for tenderizing the foodstuff. Accordingly, handle 20 may be configured to provide another culinary function. In addition to projections that are suitable for tenderizing, a blade that is suitable for cutting or a corkscrew, for example, may be included in rearward end 21. Accordingly, handle 20 may be configured to impart a second culinary function to implement 10.

Various features of implement 10 are disclosed in the above discussion. One skilled in the relevant art will appreciate, however, that the general structure of implement 10 may be modified significantly without altering the general function of implement 10. For example, different head portions 40*a*–40*e* may be modified to provide different culinary functions, a magnetic attachment system may replace release mechanism 50, or the shape of handle 20 may be modified. Accordingly, the present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A culinary implement comprising:

a handle having an elongate configuration that defines a pair of ends and a longitudinal axis extending through the ends;

a single attachment arm secured to the handle and extending beyond one of the ends of the handle, the attachment arm having a non-linear configuration that defines an end area of the attachment arm, the end area incorporating a first part of an attachment mechanism, at least one of the end area and the first part defining a rotation axis that is substantially perpendicular to the longitudinal axis; and a head portion rotatable about the rotation axis, the head portion having a cylindrical configuration with a first circular side and an opposite second circular side that is spaced from the first circular side, and the head portion having a second part of the attachment mechanism projecting outward from the second side, the second part being joinable with the first part to secure the head portion to the attachment arm, and the second part being separable from the first part to detach the head portion from the attachment arm, and the head portion being positioned such that the longitudinal axis extends through the head portion and between the first circular side and the second circular side of the head portion, wherein the attachment arm attaches to only the second side of the head portion and is absent from the first side of the head portion.

2. The culinary implement recited in claim 1, wherein the culinary implement further includes a release mechanism for separating the first part and the second part.

3. The culinary implement recited in claim 2, wherein the release mechanism includes an actuator and a connector, the actuator being incorporated into the handle and accessible from an exterior of the handle, and the connector extending through the attachment arm to join with both the actuator and the first part.

4. The culinary implement recited in claim 1, wherein the head portion is interchangeable with an alternate head portion, the alternate head portion being joinable with the first part and rotatable about the rotation axis.

5. The culinary implement recited in claim 4, wherein the head portion has a first width and the alternate head portion has a second width, the first width being greater than the second width.

6. The culinary implement recited in claim 5, wherein the longitudinal axis extends through a center of the first width when the head portion is secured to the attachment arm, and the longitudinal axis extends through a center of the second width when the alternate head portion is secured to the attachment arm.

7. The culinary implement recited in claim 5, wherein a side of the head portion defines a depression, and the end area of the attachment arm extends into the depression when the head portion is secured to the attachment arm.

8. The culinary implement recited in claim 1, wherein a plurality of projections extend outward from the head portion, the projections having a twisted configuration.

9. The culinary implement recited in claim 1, wherein a plurality of projections extend outward from the head portion, the projections having a pyramidal shape that defines a point and a height axis extending inward from the point, the projections being deformed in a direction that extends around the height axis.

10. The culinary implement recited in claim 1, wherein the head portion is configured to perform a first function, and the handle includes a device for performing a second function that is different from the first function, the device being positioned at the end located opposite the attachment arm.

11. The culinary implement recited in claim 1, wherein a plurality of projections extend from the end of the handle located opposite the attachment arm.

12. A culinary implement comprising:

a handle with an elongate configuration;

a single attachment arm extending beyond an end of the handle, the attachment arm incorporating a first part of an attachment mechanism that is located proximal an end of the attachment arm; and a rotatable head portion having a first side and an opposite second side, the second side incorporating a second part of the attachment mechanism, the second part being joinable with the first part to secure the head portion to the attachment arm, and the second part being separable from the first part to detach the head portion from the attachment arm, and a plurality of projections extend outward from the head portion, the projections having a pyramidal shape that defines a point and a height axis extending inward from the point, the projections being twisted in a direction that extends around the height axis, wherein the attachment arm extends adjacent to the second side of the head portion and is absent from an area adjacent to the first side of the head portion.

13. The culinary implement recited in claim 12, wherein the end of the attachment arm is formed by a curved portion of the attachment arm.

14. The culinary implement recited in claim 12, wherein the handle is contoured to conform with a shape of a hand.

15. The culinary implement recited in claim 12, wherein the culinary implement further includes a release mechanism for separating the first part and the second part, the release mechanism including an actuator and a connector, the actuator being incorporated into the handle and accessible from an exterior of the handle, and the connector extending through the attachment arm to join with both the actuator and the first part.

16. The culinary implement recited in claim 12, wherein the head portion is interchangeable with an alternate head portion, the alternate head portion being joinable with the first part and rotatable.

17. The culinary implement recited in claim 16, wherein the head portion has a first width and the alternate head portion has a second width, the first width being greater than the second width, and a side of the head portion defines a depression, the side of the attachment arm extending into the depression when the head portion is secured to the attachment arm.

18. The culinary implement recited in claim 17, wherein a longitudinal axis of the handle extends through a centerline of the head portion when the head portion is secured to the attachment arm, and the longitudinal axis extends through a centerline of the alternate head portion the alternate head portion is secured to the attachment arm.

19. The culinary implement recited in claim 12, wherein a plurality of projections extend from an end of the handle located opposite the attachment arm.

20. A culinary implement comprising:

a handle with an elongate configuration that defines a pair of ends and a longitudinal axis extending through the ends;

a single attachment arm extending beyond an end of the handle; and a plurality of generally cylindrical head portions that are interchangeably-securable to the attachment arm and rotatable with respect to the handle and the attachment arm, at least two of the head portions having different width dimensions, at least one of the head portions having a first circular side and an opposite second circular side spaced from the first circular side, the at least one of the head portions including a portion of an attachment mechanism projecting outward from the second circular side to join the attachment arm to the second circular side, the attachment mechanism being absent from the first circular side, and the longitudinal axis extends between the first circular side and the second circular side and is substantially centered between the first circular side and the second circular side.

21. The culinary implement recited in claim 20, wherein a longitudinal axis of the handle extends through a centerline of the width dimension of each head portion.

22. The culinary implement recited in claim 21, wherein a side of at least one of the head portions defines a depression, the attachment nun extending into the depression when the at least one of the head portions is secured to the attachment arm.

23. A culinary implement comprising:

a handle having an elongate configuration that defines a pair of ends and a longitudinal axis extending through the ends;

a single attachment arm secured to the handle and extending beyond one of the ends of the handle;

a first head portion having a generally cylindrical configuration that includes a pair of first side surfaces and a first width dimension extending between the first side surfaces, the first head portion being rotatably-securable to the attachment arm such that the longitudinal axis extends through a center point of the first width dimension, only one of the first side surfaces being joinable with the attachment arm to rotatably-secure the first head portion to the attachment arm, and the first head portion being detachable from the attachment arm, the first head portion being rotatable about a rotation axis when the first head portions is secured to the attachment arm the rotation axis being substantially perpendicular to the longitudinal axis; and a second head portion that is interchangeable with the first head portion, the second head portion having a generally cylindrical configuration that includes a pair of second side surfaces and a second width dimension extending between the second side surfaces, the second width dimension being greater than the first width dimension, and the second head portion being rotatably-securable to the attachment arm such that the longitudinal axis extends through a center point of the second width dimension, only one of the second side surfaces being joinable with the attachment arm to rotatably-secure the second head portion to the attachment arm, and the second head portion being detachable from the attachment arm, the second head portion being rotatable about the rotation axis when the second head portion is secured to the attachment arm at least one of the second side surfaces defining a depression that extends toward a center of the second head portion and along the rotation axis, the attachment arm extending into the depression when the second head portion is secured to the attachment arm.

24. The culinary implement recited in claim 23, wherein the attachment arm has a curved configuration, and an end area of the attachment arm includes a part of an attachment mechanism for joining the first head portion and the second head portion to the attachment arm.

25. The culinary implement recited in claim 23, wherein the culinary implement further includes a release mechanism for separating the first part and the second part, the release mechanism including an actuator and a connector, the actuator being incorporated into the handle and accessible from an exterior of the handle, and the connector extending through the attachment arm to join with both the actuator and the first part.

26. The culinary implement recited in claim 23, wherein a plurality of projections extend outward from the head portion, the projections having a twisted configuration.

27. The culinary implement recited in claim 23, wherein a plurality of projections extend outward from the head portion, the projections having a pyramidal shape that defines a point and a height axis extending inward from the point, the projections being deformed in a direction that extends around the height axis.

28. A culinary implement comprising:

a handle having an elongate configuration; and a head portion secured beyond an end of the handle, the head portion being rotatable with respect to the handle, and the head portion including a plurality of projections extending outward from the head portion, the projections having a pyramidal shape that defines a point and a height axis extending inward from the point, the projections being twisted in a direction that extends around the height axis.

29. The culinary implement recited in claim 28, wherein an attachment arm extends between the handle and the head portion, the attachment arm having a curved configuration that defines an end area of the attachment arm, the head portion being secured to the end area.

30. The culinary implement recited in claim 29, wherein the head portion is detachable from the end area and interchangeable with an alternate head portion.

* * * * *